United States Patent [19]
Barker

[11] Patent Number: 5,832,483
[45] Date of Patent: Nov. 3, 1998

[54] DISTRIBUTED CONTROL INTERFACE FOR MANAGING THE INTEROPERABILITY AND CONCURRENCY OF AGENTS AND RESOURCES IN A REAL-TIME ENVIRONMENT

[75] Inventor: Kent D. Barker, Sandy, Utah

[73] Assignee: Novell, Inc., Provo, Utah

[21] Appl. No.: 766,525

[22] Filed: Dec. 13, 1996

Related U.S. Application Data

[60] Provisional application No. 60/008,658 Dec. 15, 1995.
[51] Int. Cl.$^6$ .................................................. G06F 15/163
[52] U.S. Cl. ................................... 707/8; 707/9; 707/10; 707/201; 707/203; 707/102; 395/200.4; 395/200.31; 395/200.59; 395/726; 345/333
[58] Field of Search ............................ 707/8, 9, 10, 201, 707/203, 102; 395/200.4, 200.31, 200.59, 726; 345/333

[56] References Cited

U.S. PATENT DOCUMENTS

| | | | |
|---|---|---|---|
| 4,930,073 | 5/1990 | Cina, Jr. ................................. | 395/726 |
| 5,204,897 | 4/1993 | Wyman ..................................... | 380/4 |
| 5,252,951 | 10/1993 | Tannenbaum et al. ................. | 345/156 |
| 5,438,508 | 8/1995 | Wyman ..................................... | 705/8 |
| 5,535,375 | 7/1996 | Eshel et al. ............................. | 395/500 |
| 5,579,509 | 11/1996 | Furtney et al. ......................... | 395/500 |
| 5,634,114 | 5/1997 | Shipley ................................... | 395/500 |

*Primary Examiner*—Thomas G. Black
*Assistant Examiner*—Jean R. Homere
*Attorney, Agent, or Firm*—Wolf, Greenfield & Sacks, P.C.

[57] ABSTRACT

A distributed control interface for managing interoperability and concurrency among agents and system resources in a computer system. The distributed control interface provides access to system resources to all versions of authorized agents that are capable of interoperating with the resources and do not have concurrency conflicts with agents which are currently accessing those resources. It includes a resource control interface that provides resource access to all versions of recognized agents that do not have concurrency conflicts. An agent control interface manages an associated agent's request to access the resource and determines interoperability conflicts when the resource control interface is unable to do so. The agent control interface may also provide means for providing a limited scope of access to the requesting agent should the agent not be completely interoperable with the resource.

35 Claims, 6 Drawing Sheets

DISTRIBUTED CONTROL INTERFACE FOR MANAGING THE INTEROPERABILITY AND CONCURRENCY OF AGENTS AND RESOURCES IN A REAL-TIME ENVIRONMENT

BACKGROUND OF THE INVENTION

1. Field of the Invention

The present invention relates generally to concurrency and interoperability in computer systems and, more particularly, to managing interoperability and concurrency in a computer system by managing access to system resources.

2. Related Art

Concurrency is concerned with the management of the interaction between multiple, simultaneously active computing agents and system resources. Interoperability is concerned with the ability of the computing agents and system resources to successfully communicate with each other. The management of concurrency and interoperability is necessary in a wide range of system architectures, from tightly coupled, mostly synchronous parallel systems, to loosely coupled, largely asynchronous distributed systems, such as dynamic multi-tasking operating system and network operating system environments. Concurrency must be managed because the simultaneous processing of multiple computing agents often leads to subtle and often unanticipated interactions between the computing agents and system resources causing such problems as interference, deadlock, and race conditions. Likewise, it is essential to manage interoperability between the computing agents and system resources to insure that they can operate with each other over time as the agents and/or resources are modified and/or removed from the system. The inability to manage the concurrency and interoperability of multi-tasking computer systems reduces the reliability of such systems since concurrency and interoperability conflicts may cause the computing agents, system resources or complete systems to fail.

Computing agents, or simply agents, may be any functionally independent process such as software routines, modules, programs, etc. On the other hand, system resources, or simply resources, may be any available functional process or system which is accessible to one or more of the agents, such as an operating system, database, etc.

Various approaches have been implemented to address the problems of concurrency and/or interoperability. For example, one well known conventional approach is the "setver" command in the DOS operating system. Many applications designed to run on the DOS operating system check the version of DOS before running. If the DOS version is different than the DOS versions with which the application program knows it can operate with, the application programs will not execute and will report an error to the user. For example, an application program that was created when only DOS version 5.0 was available would print an error and refuse to run if it determines that the DOS version that is requesting the program to run was not version 5.0. Such a situation occurs regardless of whether the DOS version currently running on the computer is a later version than that with which the application program is configured to run with, such as version 6.0, which can support the application program.

To avoid requiring the user to obtain a new version of the application program, DOS provides the "setver" command to report an older version number to that application program in response to queries asking for the DOS version. The setver command in the DOS configuration file may be used to instruct DOS to reply with the older version number (such as version 5.0) rather than the newer version (such as 6.0) when this particular application program requests the DOS version number. Upon receipt, the application program will believe that it is running on the older DOS version and will successfully load.

A drawback to the setver command is that the configuration control must be made manually by an operator on each system. In addition, the application program cannot negotiate for interoperability; that is, the application program itself cannot request access to the DOS operating system when necessary. Rather, the setver command is only useful when there is a newer version of the DOS operating system and that newer version merely reports that it is an older DOS version to allow and older application program to operate. Moreover, the setver configuration control provides no concurrency control. When multiple application programs are simultaneously running, the setver command cannot prevent one application program from accessing system resources due to the fact that another application program is currently accessing those same resources. This likely results in either one or both of the application programs failing.

Another conventional approach is taken by OLE in the Windows operating system. Application programs running on Windows use OLE to communicate with each other. For example, a graphics image in a graphics drawing application may be transferred to a word processing program through OLE. OLE may be used to enable applications to query one another to determine what interfaces are available and to pass version numbers using an agreed-upon interface.

However, OLE does not have any method for utilizing version numbers of other version information to prevent concurrency and interoperability problems in dynamic multi-tasking operating system or network operating system environments. Rather, OLE operates at the application level above the operating system and simply allows processes to communicate with each other without defining or restricting the content of the communications and without consideration as to the versions of the communicating processes.

Another conventional approach to controlling the interoperability of simultaneously operating agents and resources is to allow only agent and resource versions of the same development level to operate at any given time. Although this approach may be the safest and most commonly implemented, it is extremely time-consuming and often inefficient, requiring, for example, a complete software product to be updated each time a product component, that is, an agent or resource, is modified. Such a condition may occur for example, when a bug is found in the software after its initial release, when new features are added to a product that requires only small portions of the product to be modified, etc.

In addition, this approach may be enforced only through the use of build-time tools such as RCS, SCCS and Make Files, which are inappropriate for real-time operations. For example, they cannot be implemented when an operating system determines that a particular agent is required to be loaded temporarily to perform a specific function.

What is needed, therefore, is a means for managing the interoperability and concurrency of agents and resources in a computer system in a real-time environment and in a manner that is transparent to the user. It is also desirable that such a system enable newer version of agents and resources to be introduced into the computer system without having to update components other than the revised agent or resource.

SUMMARY OF THE INVENTION

The present invention relates generally to a distributed control interface for managing interoperability and concurrency among one or more computing agents and system resources in a computer system. The distributed control interface provides access to system resources to all versions of authorized agents that are capable of interoperating with the system resources and do not have concurrency conflicts with agents which are currently accessing those resources.

The distributed control interface includes a resource control interface that provides resource access to all versions of recognized agents that do not have concurrency conflicts with agents currently having access to the system resources controlled by this resource control interface. In addition, an agent control interface manages an associated agent's request to access the resource control interface and determines interoperability conflicts when the resource control interface is unable to do so.

The resource control interface includes a valid agent identifier that accesses a registry of agent names to determine if the agent is one that may access the resource. It also includes a concurrency validator that determines whether providing resource access to the requesting agent would pose a concurrency problem with currently registered agents. The resource control interface also includes an interoperability validator that determines whether the version of the requesting agent is one with which the resource can properly communicate. It provides the results of these determinations to the requesting agent control interface for further processing discussed below. When an agent is valid and poses no concurrency conflicts, the resource control interface provides access information to the agent control interface.

The agent control interface includes an agent controller that interfaces with the associated agent process and requests access to the system resource through the resource control interface. An interoperability validator receives the results of the interoperability determination made by the resource control interface along with the version of the resource control interface itself. If the resource control interface did not recognize the version of the requesting agent, then the interoperability validator of the agent control interface must determine whether this particular agent poses an interoperability problem or whether this agent is a newer version than the resource, in which case some or all of the processes in the agent may successfully operate with the resource. The agent control interface may also provide means for providing a limited scope of access to the requesting agent should the agent not be completely interoperable with the resource.

Significantly, the distributed control interface enables each of the agents and resources to be individually modified without requiring other agents or resources to be updated simply by modifying the control interface associated with that agent or resource which is being modified.

Advantageously, by providing the resource control interface with the limited information of an agent ID and version number, the distributed control interface of the present invention quickly makes interoperability and concurrency determinations for all agents accessing the resource. Agents that are valid and pose no concurrency or interoperability conflicts are provided access to the resource. In addition, the allocation of the interoperability verification functions of the present invention among agents is and resources enables the present invention to provide such protection regardless of the sequence or extent that the agents and resources are modified or removed from the system.

For example, if the system resource (and therefore its associated resource control interface) are newer than the agents, then the resource control interface will reply to the previously-released agents that negotiate for access to the resource, indicating whether access is granted to each agent. However, if an agent is released after the resource, the resource control interface will not be aware of the capability of the newer agent to interoperate with the older components in the computer system. Under such circumstances, the new agent makes the interoperability determination after the resource control interface reports that it does not recognize the version of the requesting agent. Significantly, this allows any new agent or resource to explicitly determine which versions of the other components of the computer system with which it may properly interoperate. Furthermore, the present invention enables any agent or resource in the computer system to be updated without having to modify any existing resource or agent. This enables the new agent or the new version of an existing agent to be immediately interoperable with the existing system components, subject to the authority and concurrency validation processes performed by the resource control interface if the new agent determines that it can do so successfully.

Another advantage of the present invention is that it enables agents to request access to the resource by providing the resource control interface with an agent type rather than an agent name. Such an arrangement enables the present invention to manage concurrency according to characteristics of the agents. For example, the control interface may limit concurrent access to system resources to specific types of agents or to a specific number of agents of a certain type.

Another advantage of the present invention is that it provides a secure interface to the system resources. The control interface provides access only to authorized agents based upon an agent name which may be of any desired length or complexity. In addition, the control interface prevents having to make the manner in which the system resources are accessed publicly available.

Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a referenced numeral identifies the drawing in which the reference numeral first appears.

BRIEF DESCRIPTION OF THE DRAWINGS

This invention is pointed out with particularity to the appended claims. The above and further advantages of this invention may be better understood by referring to the following detailed description when taken in conjunction with the accompanying drawings, in which:

DETAILED DESCRIPTION

The present invention relates generally to a distributed control interface for managing interoperability and concurrency among one or more agents and resources in a computer system. The distributed control interface provides resource access to all versions of authorized agents that are capable of interoperating with those resources and that do not have concurrency conflicts with agents which are currently accessing those same resources. The agents may be any functional process such as software routines, modules, programs, applications, etc. On the other hand, the system resources may be any available functional process or system which provides services to requesting agents. The resources may be software, hardware, or a combination of the two, and include, for example, operating systems, databases, file servers, etc.

Figure 1A:
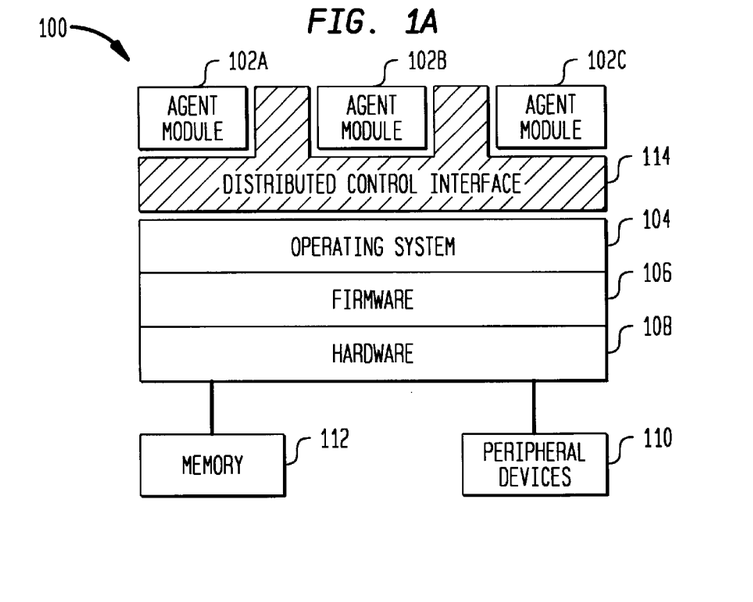
FIG. 1A is a block diagram of an exemplary multi-tasking computer system wherein the present invention may be implemented.

The distributed control interface of the present invention may be implemented in any system architecture, from tightly coupled, synchronous parallel systems to loosely coupled, largely asynchronous distributed systems. FIG. 1A illustrates an exemplary dynamic multi-tasking operating system environment in which the distributed control interface of the present invention may be implemented. Referring to FIG. 1A, computer system 100 includes multiple, simultaneously-active agent modules 102A–102C which run on operating system 104. The operating system 104 may be any well-known operating system providing an operating environment for the agents 102. The computer system 100 hosting the operating system 104 may be a general purpose computer system, which is programmable using a high level computer programming language. The computer system may also be implemented using specially programmed, special purpose hardware. The general purpose computer system 100 includes a commercially available processor, such as the Pentium microprocessor from Intel Corporation, PowerPC microprocessor, SPARC processor, PA-RISC processor or 68000 series microprocessor. Many other processors are also available. Such a processor usually executes the operating system 104 which may be various versions of the Windows and DOS operating systems from Microsoft Corporation, the Unix operating system available from many vendors such as Sun Microsystems, Inc., Hewlett-Packard and AT & T, or the NetWare operating system available from Novell, Inc., which controls the execution of other computer programs and provides scheduling, debugging, input-output control, accounting compilation, storage assignment, data management, memory management, and communication control and related services. The processor and operating system define a computer platform for which application programs in high level programming languages are written. The operating system 104 interfaces with firmware 106 and hardware layer 108 in a well-known manner to access peripheral devices 110 and memory 112. Memory 112 may be any commonly available random access memory (RAM) or read-only memory (ROM), such a resident hard drive, CD ROM, tape system, etc. In the illustrative embodiment illustrated in FIG. 1A, the agent modules 102A–102C are considered the agents while the operating system 104 is considered to be the system resource.

The distributed control interface 114 is interposed between agent modules 102A–102C and operating system 104, arbitrating the communications between the agent modules 102 and operating system 104 in accordance with the present invention as described below. In the embodiment wherein the operating system 104 is a NetWare™ network operating system (NOS), the agent modules 102A–102C are NetWare™ loadable modules (NLMs) which are programs that can be loaded and linked to function as part of the network operating system. Generally, NLMs can be used to link different types of resources or services into the NOS, making them available temporarily or for the entire time the network is running. For example, some NLMs, such as LAN and disk drivers, will be loaded every time the network server is booted. On the other hand, some NLMs, such as management utilities and server application modules, are loaded temporarily to perform specific functions as they are needed. When an NLM is loaded, NetWare™ allocates memory for the NLM to use. This memory and any resources used are returned for reuse when the NLM is unloaded.

Figure 1B:
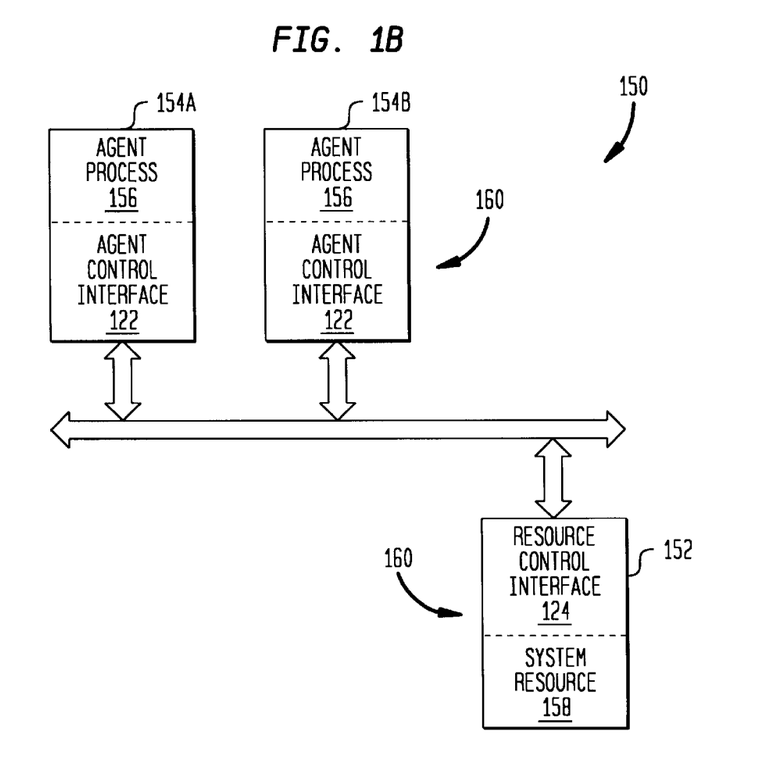
FIG. 1B is a block diagram of a distributed network wherein the present invention may be implemented.

An exemplary network operating system environment in which the distributed control interface of the present invention may be implemented is illustrated in FIG. 1B. The network system 150 includes a server node 152 and a plurality of client nodes 154A–154B, each of which contains one or more agent processes 156 that access system resources 158 over network 150 using any well-known network communication means. The distributed control interface 160 of the present invention resides in client nodes 154 and server node 152. The distributed control interface 160, manages access to the system resource 158 as described below. The server node 152 and client node 154 may be any type of computer system as described above with reference to FIG. 1A, with a network interface card (NIC) installed to communicate over the network. Other network management software may also be included as is well known in the art.

The distributed control interface of the present invention is preferably configured as a generic software application that is capable of residing on any well-known computing platform, such as the computer system 100, client node 154 and server node 152. The illustrative embodiment of the present invention includes implementing code written in the C programming language. The software routines for performing distributed control interface functions in accordance with the present invention typically reside in memory 112 and may be stored on a computer-readable medium such as, for example, magnetic disk, compact disk or magnetic tape and may be loaded into the computer system 100, server 152 or client node 154 using an appropriate peripheral device 110, as known in the art. It should be understood, however, that the present invention is not limited to a particular computer platform, particular operating system, particular processor, or particular programming language and/or algorithm. The exemplary environments identified above are given by way of example only and that the invention may be implemented in a variety of computer systems having a variety of system architectures.

As will be discussed in detail below, the distributed control interface 160 of the present invention contains portions that reside on the computer platform in which the system resources 158 reside. This portion of the distributed control interface 160 is referred to as the resource control interface 124. In addition, there are portions of the distributed control interface 160 that reside on the computer platform on which each of the agents 156 reside. These portions of the distributed control interface 160 are referred to as agent control interfaces 122.

Figure 2:
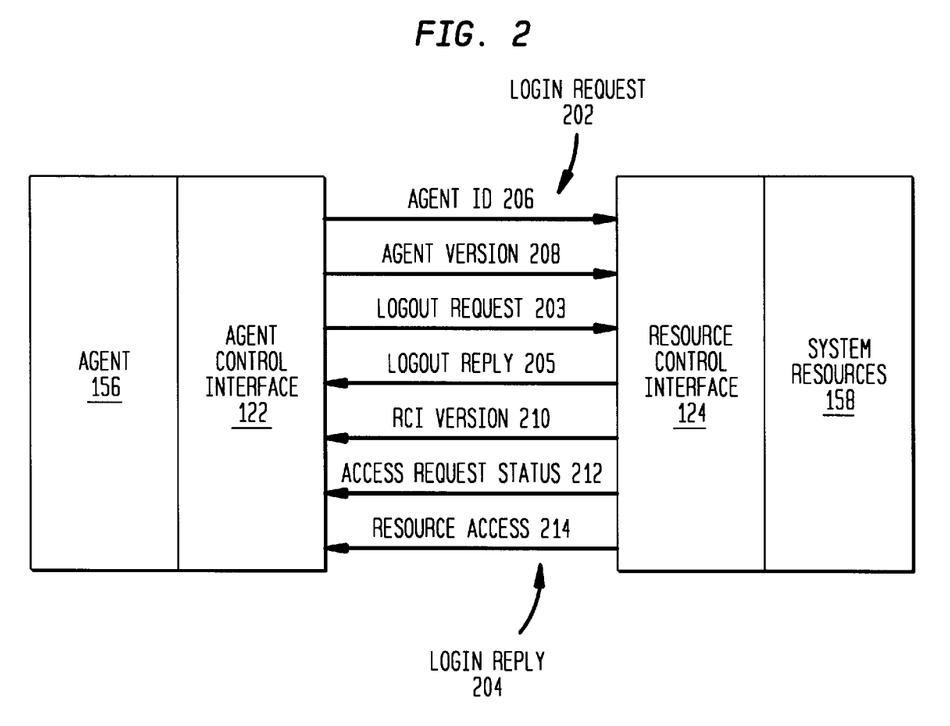
FIG. 2 is an interface block diagram illustrating the parameters passed between an agent control interface portion and a resource control interface portion of the distributed control interface of the present invention.

FIG. 2 is an interface block diagram illustrating the information passed between the agent control interface 122 and the resource control interface 124. Should the agents and resources reside on the same computer system, then the agent control interface and the resource control interface all reside on that same computer platform as illustrated in the exemplary embodiment shown in FIG. 1A. In such an embodiment, the information passed between the agent control interface 122 and the resource control interface 124 may take on any well known form for passing information between processes, such as function calls and parameters. However, if the agents and system resources reside on different computer platforms such as in the embodiment illustrated in FIG. 1B, then the information passed between the agent control interface and the resource control interface will generally include the utilization of any appropriate communication means, such as dedicated lines or network protocols.

When the agent 156 is to utilize the resource 158, the agent control interface 122 generates a login request 202 that is provided to the resource control interface 124. In response to a login request 202, the resource control interface 124 makes a number of determinations described below and generates a login reply 204 indicating to the agent control interface 124 the results of these determinations and whether the agent has been granted access to the system resources 158.

The login request 202 contains an agent ID 206 and an agent version 208 which are used by the resource control interface 124 to determine if the agent 156 is authorized to access the resources 158. This information is also used to determine whether the agent 156 and the resource 158 are interoperable, and whether providing access to the agent 156 will cause concurrency conflicts with agents which are currently accessing those same resources 158. The login reply 204 includes a resource version 210 and an access request status 212 which are used by the agent control interface to determine if the agent 156 and the resource 158 are interoperable and to provide the user with the necessary information to take corrective action should access be denied. The reply may also include resource access information 214 when access is granted to the requesting agent. Each of these components of the login request 202 and the logout reply 204 are described below.

The agent ID 206 is an agent name which uniquely identifies the associated agent process in the computer system or network. The agent ID 206 may be any type identifier appropriate for a given application. For example, the agent ID 206 may have a length and content to provide additional security to the system. For example, the agent ID may be encrypted. This is particularly useful in one embodiment of the present invention wherein the resource control interface 124 determines if the agent 156 is authorized to access the system resources 158. In such an embodiment having a randomly assigned or encoded agent ID may provide a desired level of integrity to the grant of authorization.

In addition, the agent ID 206 may be an agent type rather than an agent name. By providing the agents the ability to login to the resource control interface 124 as an agent type enables the present invention to control access to the system resources 158 according to characteristics of the agents rather than by specific agents.

The agent version 208 is the version of the agent 156 and the agent control interface 122 while the resource version 210 is the version of the resource 158 and the resource control interface 124. The access request status 212 represents the various error conditions and other types of status information which is provided by the resource control interface 124 in response to the login request 202. The resource access information 214 contains pointers to the system resource. These components of the login request 202 and the login reply 204 are described in further detail below with reference to the operation of the present invention.

When the agent 156 has completed utilizing the resources 158, the agent control interface 122 generates a logout request 203 notifying the resource control interface 124 of the completion of the agent's use of the resources 158. The resource control interface 124 generates a logout reply 205 acknowledging receipt of the request 203.

Figure 3:
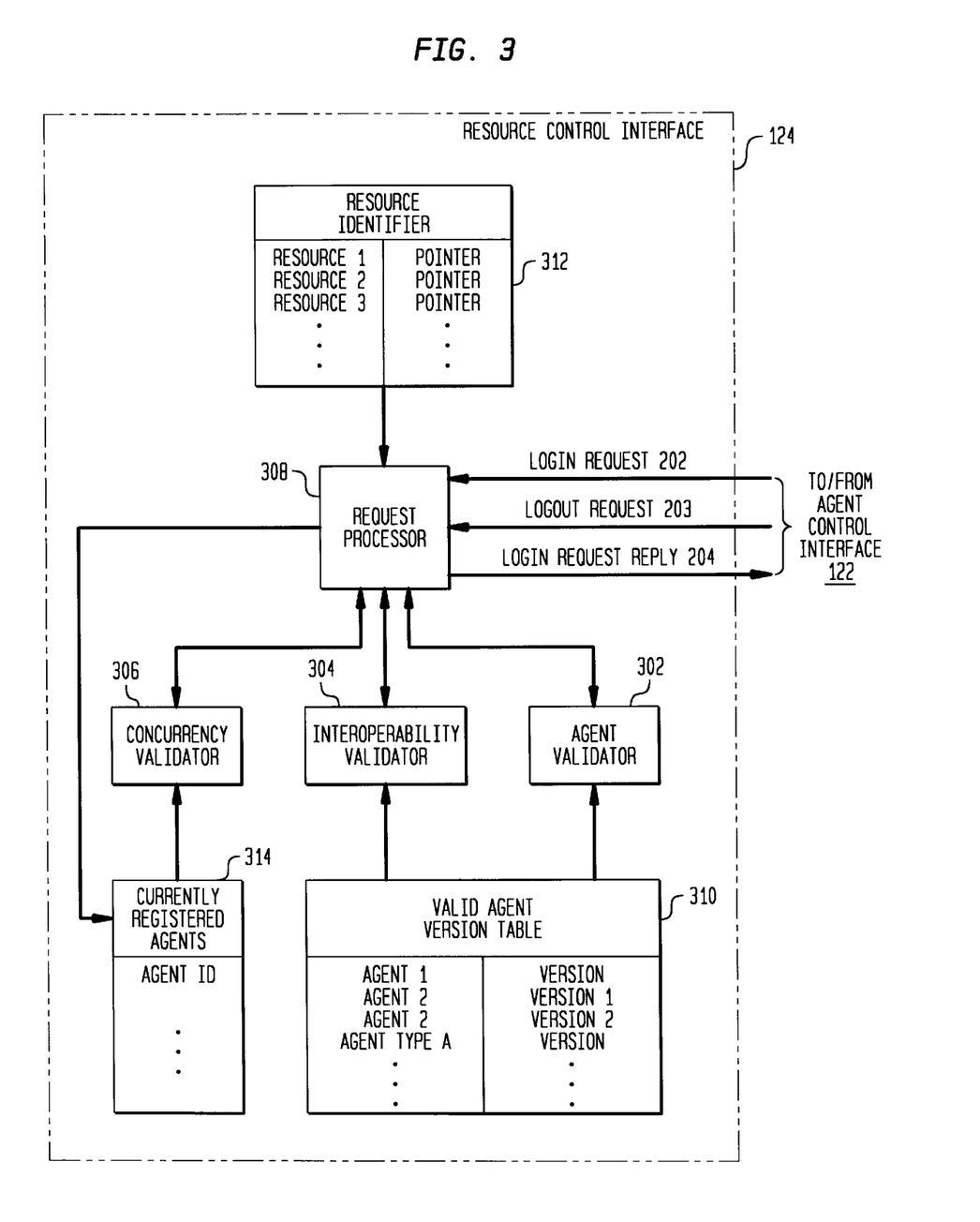
FIG. 3 is a functional block diagram of the resource control interface illustrated in FIG. 2.

A functional block diagram of the resource control interface 124 is illustrated in FIG. 3. The resource control interface 124 preferably includes an agent validator 302 for determining whether the requesting agent is authorized to access the resources controlled by the resource control interface 124. The resource control interface 124 also includes an interoperability validator 304 that determines whether the version of the requesting agent is one with which the resource can properly communicate; that is, whether the agent 156 and the system resources 158 can interoperate. In addition, the resource control interface 124 includes a concurrency validator 306 that determines whether providing resource access to the requesting agent 156 would pose a concurrency problem with agents which are currently accessing the system resources 158 controlled by the resource control interface 124. A request processor 308 receives the login request 202 and log out request 203 from the agent control interface 122 and provides each of the validators 302–306 with the necessary agent information from the login request 202 which the validators need in order to make their respective determinations. The request processor 308 also generates the login reply 204 based upon status information provided by the validators 302–306 as described below.

The validators 302–306 also access static linked information to make their respective determinations. In the illustrative embodiment shown in FIG. 3, the static information is provided in the form of tables 310, 312 and 314 stored in memory. This configuration is desirable because it enables the user to easily update the information contained in the tables without having to modify the software implementing the control interfaces. However, as one skilled in the art would find apparent, the static information may be made available to the validators 302–306 in any commonly-known manner.

The resource control interface 124 includes a valid agent version table 310 that contains a listing of all of the agents 156 and their versions which may interoperate with the resource 158 controlled by the resource control interface 124. Since multiple versions of an agent 156 may successfully interoperate with the resource 158, the valid agent version table 310 may contain more than one version for each agent 156 authorized to access the resource 158. In addition, as noted above, the agent control interface 122 may include an agent type rather than an agent name in its login request 202. Accordingly, the valid agent version table 310 also includes the agent types which are authorized to access the resources 158 controlled by the resource control interface 124.

The request processor 308 provides the agent validator 302 with the agent ID 206 of the requesting agent 156. The agent validator 302 searches the valid agent version table 310 for this agent ID 206 to determine whether the requesting agent 156 is authorized to access the resource 158 controlled by the resource control interface 124. The agent validator 302 returns the result of this determination to the request processor 308. If the agent validator 302 indicates that the requesting agent 156 is unauthorized to access the associated resources 158, the request processor 308 provides an error condition indicating such in its login reply 204. Furthermore, request processor 308 does not provide the requesting agent control interface 122 with the resource access information, thereby denying resource access to the requesting agent 156.

The request processor 308 provides the interoperability validator 304 with the agent ID 206 and the agent version 208 which it received in the login request 202 from the agent control interface 122. The interoperability validator 304 searches the valid agent version table 310 for this version of the requesting agent 156. The interoperability validator 304 returns the results of this determination to the request processor 308. If the interoperability validator 304 determined that the version of the requesting agent is not one which is interoperable with the resource 158, then the request processor 308 indicates such in the access request status 212 returned to the agent control interface 122 in the login reply 204. However, as will be described in detail below, the resource control interface 124 does not deny access to the resource 158 if the agent and version is not recognized.

The request processor 308 also provides the concurrency validator 306 with the agent ID 206 and agent version 208. The concurrency validator 306 searches the currently registered agent's table 314 and determines whether or not granting access to the requesting agent will cause concurrency conflicts with agents which currently have access to the resource control interface 124. This determination is based upon user defined criteria which may be as simple or elaborate as desired. For example, in one embodiment of the present invention, the concurrency validator 306 does not indicate that there will be concurrency conflict with any agent 156 in the system regardless of which agents are currently registered with the resource control interface 124. In another embodiment, the concurrency validator 306 indicates that a concurrency conflict will exist only when another instance of the same requesting agent 156 currently has access to the resource 158. In still another embodiment, the concurrency validator 306 makes its determination based upon a series of conditional criteria which include various combinations of agent IDs, including agent names and agent types. Alternative embodiments include any combination of all or some of these and other approaches to insure that concurrency is accurately and efficiently determined are considered to be within the scope of the present invention.

As noted, the result of this determination is provided to the request processor 308. If the concurrency validator 306 determines that providing access to the controlled resources 158 would result in a concurrency conflict with currently accessing agents, then the request processor 308 denies access to the requesting agent 156 and provides the agent control interface 122 with an indication of the cause of the access denial in the access request status 212.

In one embodiment of the present invention, the agents 156 may temporarily access the resources 158. In this embodiment, the request processor 308 modifies the contents of the currently accessing agents table 314 as the agents gain and release access to the resource 158. The request processor 308 adds the agent ID of agents as they are granted access to the resource 158 and deletes agent IDs in the table in response to the log out requests 203 generated by currently accessing agents.

The resource identifier table 312 contains pointers to the resources 158 which are controlled by the resource control interface 124. These pointers are typically address locations of the resource, and may be, for example, pointers to a function to create an object in a database, pointers to a function to read a property, pointers to a function to read a record, pointers to a data unit value in a table, etc.

The request processor 308 provides the agent control interface 122 with the contents of the resource identifier table 312 when it grants access to a requesting agent 156. This occurs when the agent validator 302 determines that the requesting agent is authorized to access the controlled resources and the concurrency validator 306 indicates that providing such access will not cause a concurrency conflict with currently accessed agents.

The request processor 308 provides the pointers of the resource identifier table 312 to the requesting agent in the login reply 204. Preferably, the resource identifier table 312 is in a commonly available memory location enabling the request processor 308 to simply provide the address of the resource identifier table 312 to the agent control interface 122. Alternative means for providing the agent control interface 122 with the contents of the resource identifier table 312 are considered to be well-known in the art.

It should be noted that in the illustrative embodiment the request processor 308 communicates with the agent control interface 122. However, in other embodiments the agent control interface 122 communicates directly with the individual validators 302–306. This may be, for example, when the agent control interface 122 and the resource control interface 124 reside on the same computer platform. In such an embodiment, the agent control interface 122 may communicate with the validators through procedure calls if the validators are procedures which may be called; or through memory if all the validators are contained within a single, larger software program. Numerous variations and arrangements are considered to be well-known in the art and within the scope of the present invention.

Figure 4:
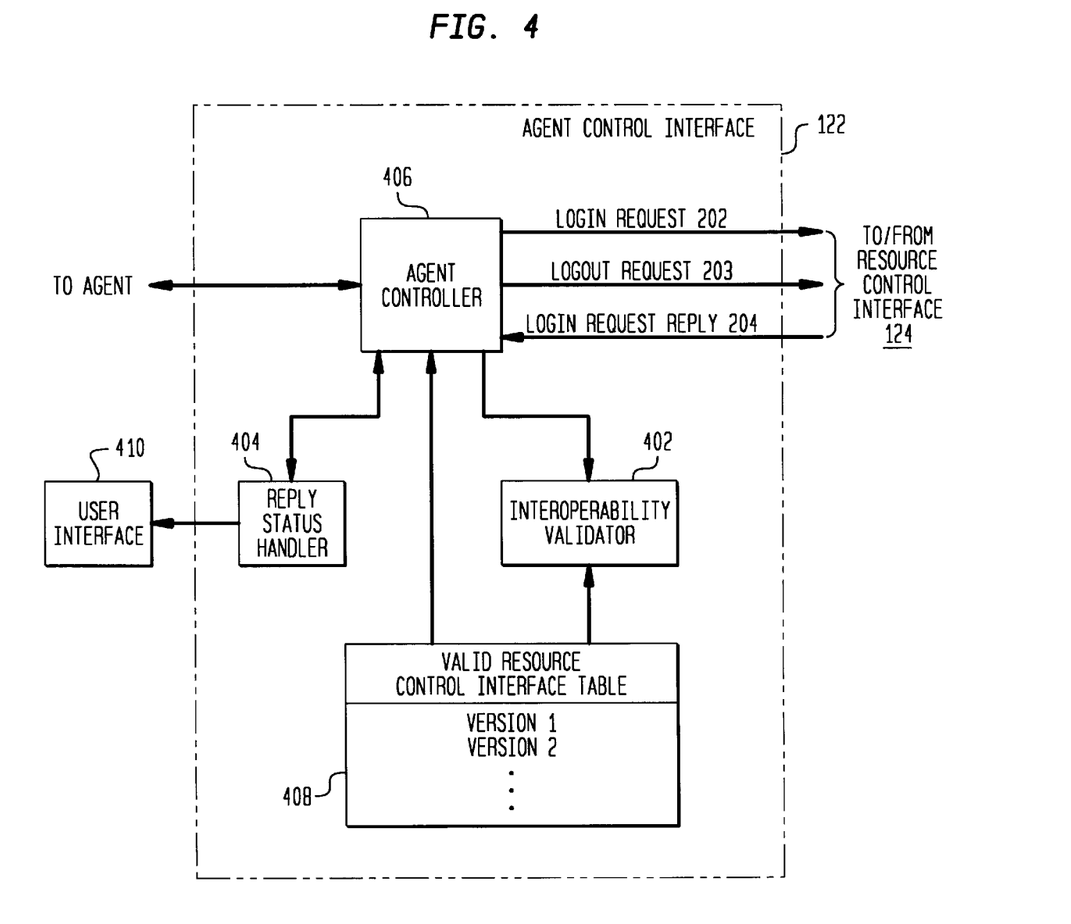
FIG. 4 is a functional block diagram of the agent control interface illustrated in FIG. 2.

FIG. 4 is a functional block diagram of the agent control interface illustrated in FIG. 2. The agent control interface 122 contains an interoperability validator 402 that determines the capability of the associated agent 156 to interoperate with the resources 158 that the agent 156 is requesting to access. A reply status handler 404 provides the user with an indication of the status of the agent's attempt to access the system resources through user interface 410 such as a display or printer. An agent controller 406 generates the login request 202 and log out request 203 based upon commands generated by the agent 156. In addition, the agent controller 406 receives the login reply 204 from the resource control interface 124.

The interoperability validator 402 receives the results of the interoperability determination made by the resource control interface 124 along with the version of the resource control interface 124. If the interoperability validator 304 of the resource control interface 124 was unable to locate the agent's version in the valid agent version table 310, then the resource control interface 124 indicated such in the access request status 212 included in the login reply 204.

Since the agents and the resources may be updated at different times, the resource control interface 124 cannot conclude that the agent 156 should be denied access to the resource 156 due to an inability to interoperate with the resource 158. The agent 156 may not have been included in the valid agent version table 310 because it was modified more recently than the resource control interface 124. In such a circumstance, the agent 156 may successfully interoperate with the resource 158. Thus, the present invention includes the interoperability validator 402 in the agent control interface 122 to make the interoperability determination when the resource control interface 124 is unable to do so. The agent control interface 122 is updated with the agent and includes the version of the agent 158 regardless of whether the agent is updated before or after the resource 158.

Thus, if the resource control interface 124 returns an indication that it was unable to determine whether the requesting agent is interoperable with the resource 158, then the interoperability validator 402 determines whether the requesting agent poses an interoperability problem because it is a version of the agent that cannot interoperate with the resource 158 or whether the agent is new and can interoperate with the resource 158.

The agent control interface 122 includes a valid resource control interface table 408 that is accessed by the interoperability validator 404 to make this determination. The valid resource control interface table 408 contains a listing of all of the resource versions with which the requesting agent 156 can properly interoperate. Thus, if the requesting agent 156 is new and can interoperate with the resource 158, then the interoperability validator 402 will determine that the agent is to be granted access. The resource controller 406 will then invoke the agent since the login request reply 204 included the resource access information.

In one embodiment of the present invention, the agent control interface 122 also contains the ability to provide a limited scope of access to the requesting agent should this agent not be completely interoperable with the resource. Since the requesting agent 156 is newer than the resource 158, there may be functions or processes that the requesting agent 156 may be capable of utilizing which are not available in the older resource. The agent processes that require these particular resources may not be implemented. Instead, only the agent processes which can be invoked and successfully interoperate with the older resource are invoked.

It should be noted that the various implementations discussed above with respect to the resource control interface 124 are applicable to the agent control interface 122.

Significantly, by distributing the interoperability determination function among the agents and resource control interfaces, the distributed control interface of the present invention enables each of the agents 156 and resources 158 to be individually replaced or updated without requiring other agents or resources to be updated, simply by updating the control interface associated with the updated agent or resource. When a newer version of the agent control interface is created, it knows of all preceding resource versions. The newer agent control interface will then become the authoritative source providing interoperability determinations. This allows for the continual update of processes, tasks, modules and other components of a system without jeopardizing the operation of any other component in the system.

Figure 5:
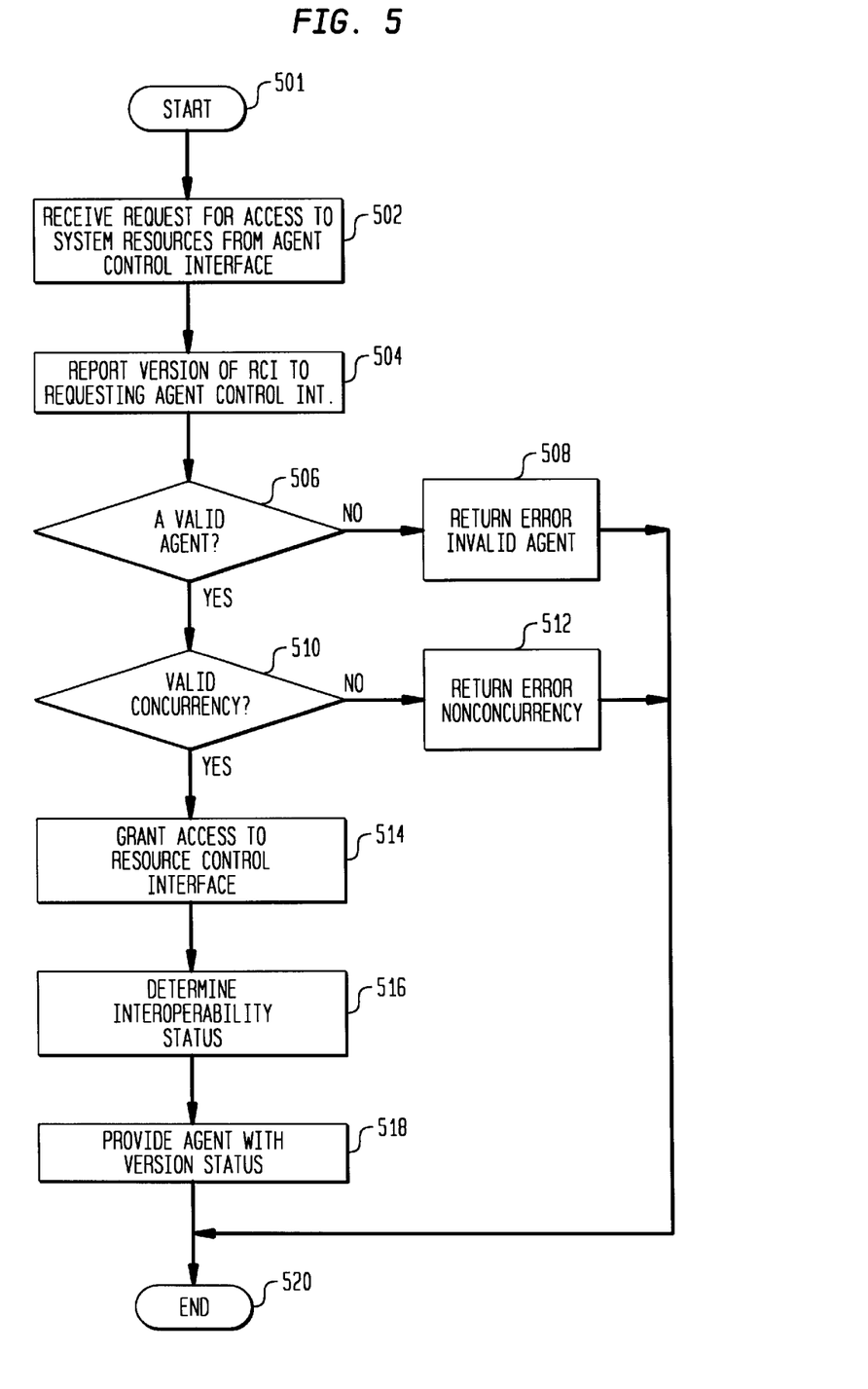
FIG. 5 is a flowchart of the functions performed by the resource control interface illustrated in FIG. 3.
Figure 6:
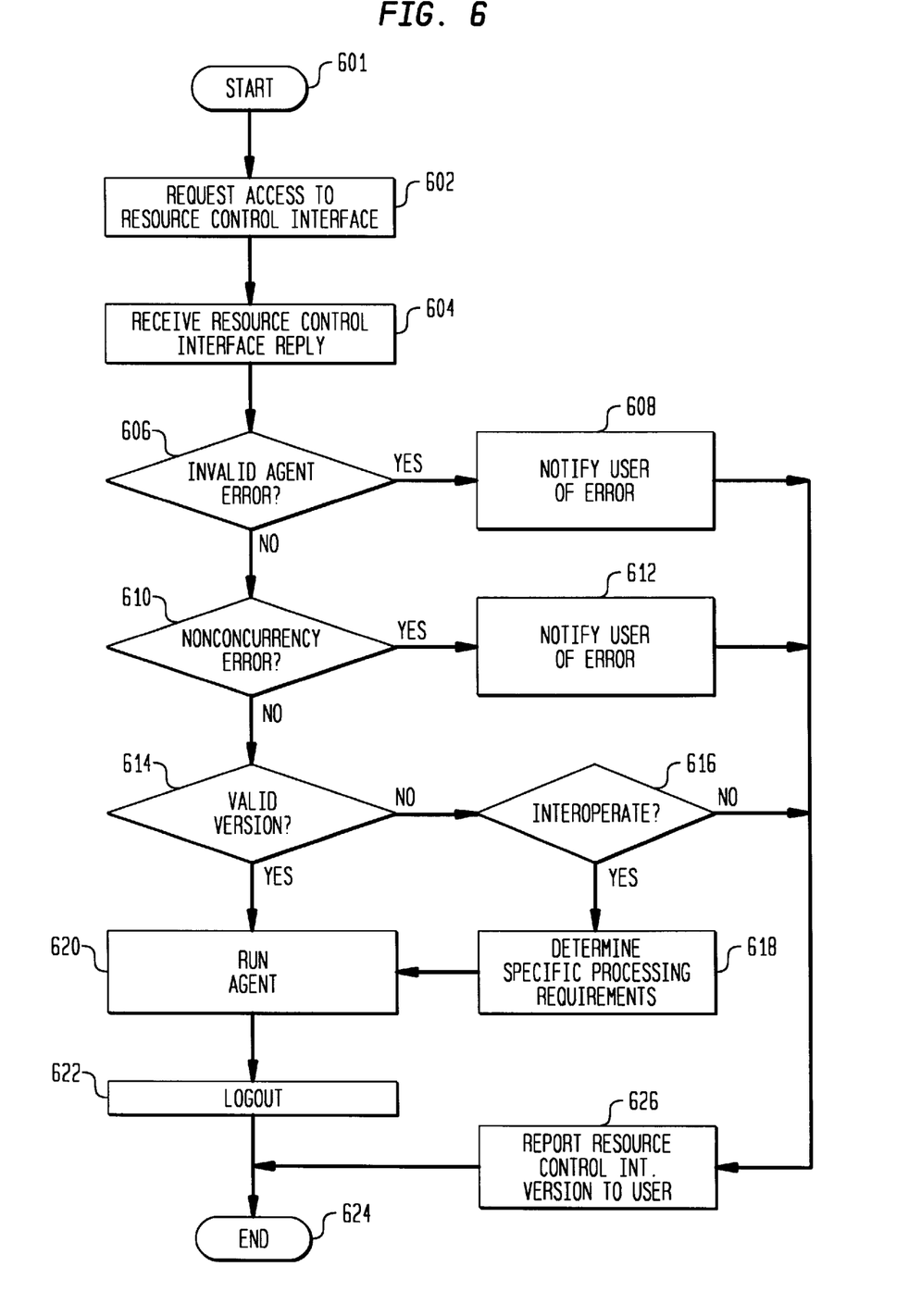
FIG. 6 is a flowchart of the functions performed by the agent control interface illustrated in FIG. 4.

The functions performed by the resource control interface 124 and the agent control interface 122 to perform the concurrency and interoperability validation process of the present invention are described with reference to FIGS. 5 and 6. FIG. 5 is a flow chart of the functions performed by the resource control interface 124 while FIG. 6 is a flow chart of the functions performed by the agent control interface 122.

Referring to FIG. 5, at start block 501 the resource control interface 124 is loaded and made operational in the computer platform in which the controlled resources reside. Loading of the resource control interface 124 is accomplished by means well known in the art. Initialization is carried out according to well-known techniques, making the resource control interface 124 ready to negotiate with the resource 158 and the agent control interfaces 122 that requests access to the resources 158.

At block 502, the resource control interface 124 receives a login request 202 from an agent control interface 122. As noted above, this login request 202 contains the agent ID 206 and agent version 208. The resource control interface 124 reports to the requesting agent control interface 122 the version of the resource control interface 124 at block 504. The resource control interface 124 provides its version number for use by the agent control interface 122 in making interoperability determinations and to provide such information to the agent 156 and/or user through the user interface should access be granted. Alternatively, the agent control interface 124 may also use the version of the resource control interface 124 when access is granted and the resource control interface 124 was unable to determine whether or not the requesting agent is able to interoperate with the resource 158.

At block 506 the agent validator 302 determines whether the requesting agent 156 is authorized to access the resources 158 controlled by the control interface 124. The agent validator 302 performs this function by comparing the agent ID provided to the resource control interface 124 in the login request 202 with the agent IDs known to the resource control interface 124 to be valid. As noted, the agent ID may be created and certified using well-known cryptography techniques known in the art. If the requesting agent is not authorized to access the resources 158, then processing continues to block 508 wherein the resource control interface 124 denies access to the resource 158 and returns an error to the agent control interface 122 indicating that the agent is invalid. Processing then stops at end block 520.

If the resource control interface 124 determines that the agent is valid, then the resource control interface 124 determines, at block 510, whether the requesting agent may access the controlled resources without causing concurrency problems with currently accessed agents. If so, then control advances to block 512 wherein the resource control interface 124 denies access to the resource 158 and returns an indication of this non-concurrency. Control then continues at end block 520 wherein the resource control interface 124 ceases processing.

If it is determined that providing access to the requesting agent 156 will not provide a concurrency conflict with currently registered agents at block 510, then processing continues at block 514 wherein the resource control interface 124 grants access to the requesting agent 156 by providing the agent control interface 122 with the resource access information noted above. As noted, this information generally contains pointers to various resources controlled by the resource control interface 124.

Thus, the resource control interface 124 will provide access to the requesting agent if that agent is authorized to access the resources and providing such access does not cause a concurrency conflict with currently registered agents.

At block 516 the resource control interface 124 determines whether the version of the requesting agent is one with which the resource 158 may properly interoperate. The resource control interface 124 provides the agent control interface 122 with a status indicating whether the resource can properly interoperate with this version of the requesting agent at block 518. As noted, the resource control interface 124 does not deny access to a requesting agent 122 that it determines may not operate with the resource 158. Processing of the resource control interface 124 then ceases at end block 520.

FIG. 6 is a flow chart of the functions performed by the agent control interface 122. At start block 601 the agent control interface 122 is loaded and made operational in the computer platform hosting the associated agent process 156. Once the agent control interface 122 is made operational it enters a wait mode responsive to the agent 156.

At block 602, the agent control interface 122, responsive to the agent 156, requests access to the resource controlled by the resource control interface 124. The agent control interface 122 generates a login request 202 which is transferred to the resource control interface 124 via the communication means appropriate for the environment in which the agent 156 and system resources 158 are implemented. The resource control interface 124 receives and processes the login request 202 and responds to the agent control interface 122 with a login reply 204 which is received by the agent control interface 122 at block 604. At block 606, the agent control interface 122 evaluates the reply to determine whether the associated agent 156 is authorized to access the system resource 158. If the agent is not authorized to access the resource 158, then processing advances to block 608 wherein the agent control interface 124 notifies the user that access to the resource 158 has been denied for lack of authorization. At block 626 the agent control interface reports to the user the version of the resource control interface so that the user can take corrective action. The agent control process does not invoke the agent 156 and control advances to end block 624.

If the login reply 204 indicates that the agent is valid, then the agent control interface 122 examines the login reply 204 to determine if there is an indication of a concurrency conflict. If the resource control interface 124 indicates that providing access to the system resource at this time would pose a concurrency conflict with currently accessing agents, then processing advances to block 612. At block 612 the agent control interface 122 notifies the user that access has been denied due to a concurrency conflict. Processing then continues at block 626 wherein the agent control interface reports to the user the version of the resource control interface so that the user can take corrective action. Then at end block 624 the agent control interface 122 processing is completed without invoking the agent 156.

If the agent control interface 122 determines that the resource control interface 124 considered the requesting agent to be valid and not to pose a concurrency conflict, then the agent control interface 122 reviews the reply 204 to determine if the resource control interface 124 recognized the version of the requesting agent as one with which the resources 158 can interoperate. If the resource control interface 124 determined that the requesting agent 156 and resources 158 can interoperate, then processing advances to block 620 wherein the agent control interface 122 independently determines whether the requesting agent 156 can interoperate with the resource 158. If the requesting agent 156 is newer than the resource 158, then the agent control interface 122 has been updated more recently than the resource control interface 124. As a result, the agent control interface 122 will have the necessary information to determine whether the newer version of the requesting agent 156 can interoperate with the older controlled resource 158. If the agent control interface 122 determines that the requesting agent cannot interoperate with the resource, then processing advances to end block 624, bypassing the invocation of the requesting agent. This may occur, for example, when the requesting agent 156 was not recognized by the resource control interface 124, not because it is a newer requesting agent, but rather because it is an older agent which is unable to properly interoperate with the protected resource.

If the access control interface 122 determines that the requesting agent 156 can interoperate with the protected resource at block 616, then processing continues at optional block 618 wherein the agent control interface 122 determines the scope of access that should be provided to the requesting agent 156.

Since the requesting agent 156 is newer than the resource 158, there may be functions or processes that the requesting agent 156 may use which are not available in the older resource 158. However, there may be one or more agent processes which can be invoked and successfully interoperate with the older resource 158. The agent control interface 122 grants limited access to the resource control interface 124 at block 620 where the selected processes of the requesting agent are invoked.

When the requesting agent 156 has completed accessing the resource 158, then the agent control interface 122 logs-out the agent 156 with the resource control interface 124 at block 622. This enables the resource control interface 124 to provide access to the protected resource to other agents which would otherwise have conflicted with the requesting agent. Processing then continues at block 626 wherein the agent control interface reports to the user the version of the resource control interface so that the user can take corrective action. Then at end block 624 the agent control interface 122 processing is completed without invoking the agent 156.

It is noted that the present invention is well-suited for use in managing NetWare loadable module (NLM) agents under the NetWare network operating system. In such an environment, the present invention assists in the prevention of unauthorized use of the system resource, agents, or other network operating system or operating system code. In some circumstances, physical access to a server previously provided knowledgeable individuals with the ability to covertly load unauthorized NLMs or otherwise make improper use of a network. Instead of providing the expected functionality, such accesses will likely lead to detectable conditions exposing the covert use or at least inhibiting it. Thus, in addition to enforcing concurrency constraints and interoperability, the present invention can be used to enforce system security and conformance with licensing restrictions. In addition, the present invention effectively makes exported procedures available only when the dependencies are known to the control interface. This allows appropriate personnel to replace NLMs in the field as needed to install patches or upgrade functionality.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The invention claimed is:

1. A distributed control interface for managing interoperability and concurrency among agents and resources in a computer-based system, comprising:

a resource control interface configured to determine whether a requesting agent is capable of interoperating with an associated resource and does not present a concurrency conflict with any agent which currently has access to said associated resource; and an agent control interface associated with said requesting agent, configured to make a second determination as to whether said associated agent can interoperate with said associated resource when said resource control interface determines that said associated agent cannot interoperate with said associated resource, wherein the distributed control interface provides access to said associated resource to said associated agent when said associated agent is determined to be interoperable with said associated resource by either said resource control interface or said agent control interface and determined to not present said concurrency conflict.

2. The distributed control interface of claim 1, wherein said agent control interface provides said resource control interface with an identifier and a version of said associated agent, and wherein said resource control interface comprises:

a concurrency validator configured to implement user-defined concurrency conditions to make said concurrency conflict determination; and a first interoperability validator configured to determine whether said version of said associated agent can interoperate with said associated resource.

3. The distributed control interface of claim 2, wherein said resource control interface provides said agent control interface with a version of said associated resource, and wherein said agent control interface comprises:

a second interoperability validator configured to make said second interoperability determination based on said resource version.

4. The distributed control interface of claim 3, wherein said second interoperability validator also receives said interoperability determination from said resource control interface and makes said second interoperability determination only when said resource control interface determines that said associated agent is not interoperable with said associated resource.

5. The distributed control interface of claim 3, wherein said agent control interface further comprises:

means for providing said associated agent with a limited scope of access to said associated resource when said associated agent is not completely interoperable with said associated resource.

6. The distributed control interface of claim 2, wherein said concurrency validator accesses a registry of agent identifiers of currently accessing agents to make said concurrency conflict determination.

7. The distributed control interface of claim 2, wherein said first interoperability validator compares said identifier and said version of said associated agent to a listing of identifiers and versions of agents that may interoperate with the resource.

8. The distributed control interface of claim 1, wherein the computer-based system is a distributed network-based system and wherein said agent control interface and said associated agent are located on a first node in the system and said resource control interface and said associated resource are located on a second node different than said first node in the system.

9. The distributed control interface of claim 1, wherein the computer-based system is a dynamic multi-tasking system and wherein said agent is a software program and further wherein said associated resource is an operating system configured to simultaneously execute one or more agents.

10. The distributed control interface of claim 1, wherein said agent identifiers are agent names.

11. The distributed control interface of claim 1, wherein said agent identifiers are are agent types.

12. The distributed control interface of claim 2, wherein resource control interface further comprises:

an agent validator configured to determine whether said associated agent is an agent having authority to access said associated resource, wherein said distributed control interface provides access to said associated agent only when said associated agent is an authorized agent.

13. The distributed control interface of claim 12, wherein said agent validator compares said agent identifier with a list of authorized agent identifiers to determine whether said associated agent is an agent authorized to access said associated resource.

14. A distributed control interface for managing interoperability and concurrency among agents and resources in a computer-based system, comprising:

a resource control interface configured to maintain authority, interoperability and concurrency information for an associated one or more system resources; and one or more agent control interfaces configured to maintain interoperability information for an associated one of the agents, wherein a most recently updated one of said resource control interface and said agent control interface determines whether said associated agent can interoperate with said associated one or more system resources, and wherein said distributed control interface grants access to said associate agent only when said associated agent is authorized to access said associated one or more resources, does not pose concurrency conflicts with agents currently accessing said associated one or more resources, and can interoperate with said associated one or more resources.

15. The distributed control interface of claim 14, wherein said agent control interface provides said resource control interface with an agent identifier and an agent version of said associated agent, and wherein said resource control interface comprises:

an agent validator configured to determine whether said associated agent is an agent authorized to access said associated one or more resources;

a concurrency validator configured to implement concurrency conditions to determine whether said associated agent has a concurrency conflict with said currently-accessing agents; and a first interoperability validator configured to determine whether said version of said associated agent can interoperate with said associated one or more resources.

16. The distributed control interface of claim 15, wherein said resource control interface provides said agent control interface with a version indication of said associated one or more resources, and wherein said agent control interface comprises:

a second interoperability validator configured to make a second interoperability determination based upon said resource version.

17. The distributed control interface of claim 16, wherein said second interoperability validator also receives said interoperability determination from said resource control interface and makes said second interoperability determination only when said resource control interface determines that said associated agent is not interoperable with said associated one or more resources.

18. A distributed control interface for managing interoperability and concurrency among one or more agents and system resources in a computer system, comprising:

resource control means for controlling access to the system resources, said resource control means providing said access to all versions of recognized agents that are capable of interoperating with the system resource and that do not have concurrency conflicts with agents currently accessing the system resources; and agent control means for managing an associated agent's request to access the system resources.

19. The distributed control interface of claim 18, wherein said agent control means provides said resource control means with an agent ID and an agent version of said associated agent, and wherein said resource control means comprises:

agent validation means for determining whether said associated agent is an agent authorized to access said system resources;

concurrency validation means for implementing concurrency conditions to determine whether said associated agent has a concurrency conflict with said agents currently assessing the system resources; and interoperability validation means for determining whether said version of said associated agent can interoperate with the system resources based on said agent ID and said agent version of said associated agent.

20. The distributed control interface of claim 19, wherein said resource control means provides said agent control means with a version of the system resources, and wherein said agent control means comprises:

second interoperability validation means for determining whether said associated agent is interoperable with the system resources based upon said version of the system resources.

21. The distributed control interface of claim 20, wherein said second interoperability validation means receives said interoperability determination from said resource control means and makes said second interoperability determination only when said resource control means determines that said associated agent is not interoperable with said associated resources.

22. The distributed control interface of claim 20, wherein said agent control means further comprises:

means for providing said associated agent with a limited scope of access to said associated resources when said associated agent is not completely interoperable with the system resources.

23. A system for managing interoperability and concurrency among one or more agents and system resources in a computer system, comprising:

a resource control interface constructed and arranged to for controlling access to a system resource, said resource control interface providing said access to all versions of recognized agents that can interoperate with the system resources and that do not pose a concurrency conflict with agents currently accessing the system resource, and agent control interface for managing an associated agent's request to access the system resource, said agent control interface providing said resource control interface with an identifier and a version of said associate agent.

24. The system of claim 23, wherein said resource control interface comprises:

concurrency validation subsystem constructed and arranged to implement user-defined concurrency conditions to determine whether said associated agent has a concurrency conflict with said agents currently accessing the system resource; and interoperability validation subsystem constructed and arranged to determine whether said version of said associated agent can interoperate with said associated resource.

25. The system of claim 24, wherein said resource control means provides said agent control means with a resource version, and wherein said agent control means comprises:

second interoperability validation means for determining whether said associated agent is interoperable with said associated resources based upon said resource version received from said resource control means.

26. The system of claim 24, wherein said resource control interface further comprises:

agent validation subsystem constructed and arranged to determine whether said associated agent is an agent authorized to access said associated resource, wherein said resource control interface provides said access only to authorized agents.

27. A computer program product comprising a computer readable medium having computer program logic thereon for enabling a processor in a computer system to manage interoperability and concurrency among one or more agents and system resources in a computer system, comprising:

resource control means for controlling access to as associated one of the system resources, said resource control means providing said access to all versions of recognized agents that do not have concurrency conflicts with agents currently accessing the associated system resource, and agent control means for managing an associated agent's request to access the associated system resource.

28. The computer program product of claim 27, wherein said agent control means provides said resource control interface with an agent ID and an agent version, and wherein said resource control means comprises:

agent validation means for determining whether said associated agent is an agent authorized to access said associated resources;

concurrency validation means for implementing user-defined concurrency conditions to determine whether said associated agent has a concurrency conflict with said currently-accessing agents; and interoperability validation means for determining whether said version of said associated agent can interoperate with said associated resource.

29. The computer program product of claim 28, wherein said resource control means provides said agent control means with a resource version, and wherein said agent control means comprises:

second interoperability validation means for determining whether said associated agent is interoperable with said associated resource based upon said resource version received from said resource control means.

30. A distributed control interface for managing interoperability and concurrency among agents and resources in a computer-based system, comprising:

a resource control interface associated with one or more resources, configured to provide access to said associated resources to authorized agents that can interoperate with said associated resources and do not have concurrency conflicts with agents currently accessing said associated resources, said resource control interface including,
- an agent validator configured to determine whether said associated agent is an agent authorized to access said associated one or more resources,
- a concurrency validator configured to implement user-defined concurrency conditions to determine whether said associated agent has a concurrency conflict with said currently-accessing agents, and
- an interoperability validator configured to determine whether said version of said associated agent can interoperate with said associated one or more resources one or more agent control interfaces each associated with one of the agents, said associated agent having a version and an ID, said one or more agent control interfaces configured to determine if said associated agent can interoperate with said associated one or more resources, said agent control interface including,
- a second interoperability validator configured to make a second interoperability determination based upon said resource version received from said resource control interface, where the distributed control interface provides access to said associated resources to all interoperable, non-concurrency-conflicting versions of authorized agents.

31. A method for managing interoperability and concurrency among agents and resources in a computer-based system, comprising the steps of:
   a) requesting, by an agent control interface associated with an agent, access to resources through a resource control interface associated with the resources, said request containing an agent ID and an agent version;
   b) determining, by the resource control interface, whether the requesting agent may access the resources without causing a concurrency conflict with agents currently accessing the associated resources;
   c) determining, by the resource control interface, whether the agent and the version of the requesting agent identifies an agent with which the associated resource may properly interoperate;
   d) generating a reply to the agent control interface, said reply providing the agent control interface with,
      i) resource access information when said requesting agent is authorized to access the resources and providing such access does not cause a concurrency conflict with currently registered agents,
      ii) a status indicating whether the resource can properly interoperate with this version of the requesting agent, and
      iii) a version of the resource control interface;
   e) determining, by the agent control interface, whether the associated agent can interoperate with the resource when said status indicates that the resource control interface considered the version of the requesting agent to not be interoperable with the resource; and
   f) granting, by the agent control interface, access to the requesting agent only when (1) said agent control interface determines at said step e) that said requesting agent is interoperable with the resource and (2) when said reply includes said resource access information.

32. The method of claim 31, wherein said step c) comprises the steps of:
   1) comparing the agent ID provided to the resource control interface in the login request with the agent IDs known to the resource control interface to be valid.

33. The method of claim 31, wherein said step e) comprises the steps of
   1) providing the agent control interface with the resource access information.

34. The method of claim 31, further comprising the steps of:
   g) determining, by the agent control interface, a scope of access to be provided to the requesting agent when said status indicates that the resource cannot properly interoperate with this version of the requesting agent.

35. The method of claim 31, further comprising the steps of:
   h) determining, by the resource control interface, whether the requesting agent is authorized to access the resources.

* * * * *